March 2, 1965 R. G. DREWES ETAL 3,172,074

ELECTRICAL RESISTORS

Filed July 17, 1961

INVENTORS
RAYMOND G. DREWES
THEODORE MATLEY
BY
ATTORNEY 3,172,074
ELECTRICAL RESISTORS
Raymond G. Drewes, Mendham Township, Morris County, and Theodore Matley, Somerset, N.J., assignors, by mesne assignments, to Weston Instruments, Inc., a corporation of Texas
Filed July 17, 1961, Ser. No. 124,716
7 Claims. (Cl. 338—308)

Figure 1:
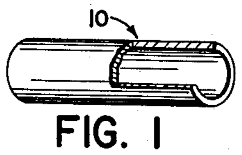

This invention relates to electrical components which employ thin films and also to a method for manufacturing such components.

New technological developments, particularly in electronic circuits, have created a need for electrical components which are made smaller in size and operationally more stable under severe environmental conditions than those which had been generally available.

As a result, considerable research effort has been directed toward developing new manufacturing techniques which will produce components to meet these new requirements. One of the newer concepts for manufacturing electrical components, such as resistors, employs the deposition of thin electrically conductive films. Thin films of carbon, metals, and metal oxides have been employed among others. Currently, efforts are being directed toward the deposition of a metallic film on non-conducting substrates such as, for example, alumina, glass, steatite, etc., by a number of techniques. These includes such processes as evaporation, pyrolytic deposition and cracking, electro-deposition or plating, and others.

The evaporation or vapor deposition technique has become a preferred method for manufacturing high-quality, thin film resistors. Generally, the manufacture of such components by this method involves the steps of enclosing a substrate material in a suitable vacuum chamber, evacuating air from the chamber with appropriate high vacuum pumping equipment until the necessary degree of vacuum is obtained, depositing a thin film of suitable metal on the substrate material as a result of vaporizing the metallic material in the vacuum, and annealing the resulting assembly.

Resistance elements produced by this method have excellent electro-physical characteristics, however the method has certain important disadvantages. One of these is that the thin metal film is deposited under high vacuum conditions requiring a considerable initial investment of capital in apparatus for carrying out the process even in its simplest form. For example, the minimum apparatus necessary includes rather expensive vacuum pumps for producing a high vacuum, suitable vaporization chambers having sufficient strength to withstand the forces produced when a high vacuum is produced and other miscellaneous complementary apparatus. In addition to the disadvantage of high initial equipment cost, the process requires a prolonged period for pumping down the atmosphere inside the vaporization chamber to the proper degree of vacuum required for satisfactory deposition of the material on the substrate. This time is susually of the order of an eight hour working day for each pumping operation.

Another very important disadvantage of the vapor deposition process is that it is not easily adapted to the manufacture of components of various shapes. For example, when this process is employed to deposit a coating on a resistor blank having a curved surface, different thicknesses will often result at different areas of the film. Accordingly, the process is necessarily a batch manufacturing operation so that it is practically impossible to mass produce the resistors on a continuously flowing production line basis.

Further, the resistance units manuafctured by the vapor deposition method are inherently unstable and as a consequence require additional processing to modify their characteristics. This processing comprises a heat treating cycle for altering the resistance characteristics so that the units will be sufficiently stable for either ordinary resistance applications or for special applications where high quality resistors having a very high degree of stability are required. This heat treatment phase requires exposure of the unit to elevated temperatures for a long period of time.

The time required for this phase, along with the pumping down time, and the time required for the other necessary steps in the manufacturing process consume approximately one production week. Such a long manufacturing period is a further disadvantage since certain manufacturing defects cannot be easily detected before the end of the period and therefore processing of an unsatisfactory batch can continue for days before this fact can be discovered.

Finally, the metals which have been found satisfactory for the manufacture of resistance units by the vaporization process produce a component having a non-linear temperature coefficient of resistance with temperature changes. This is undesirable since these resistors are used primarily in many applications where a linear temperature coefficient is preferred. The temperature coefficient of resistance of components produced by the deposition of metals according to the prior art vaporization process renders the components suitable for some applications, but unsuited for others since the temperature coefficient of resistance of these components cannot be substantially modified to desired values.

Accordingly, it is an object of this invention to produce a high-quality, thin film electrical component having extremely stable resistance characteristics, which characteristiss are capable of modification to selectively predetermined specifications by predetermined treatment during manufacture.

Another object of this invention is to produce a high-quality, thin film electrical component in which the resistance value and the temperature coefficient of resistance may be modified to certain desired values by predetermined processing procedures.

A further object is to manufacture high quality electrical components having stable resistance charatceristics by a new and different method which is superior to the various methods heretofore known for manufacturing such components.

Still another object is to produce miniature high-quality, thin film electrical components having stable resistance characteristics by a much quicker, simpler, and more reliable manufacturing method which can be more easily controlled and which results in fewer manufacturing rejects than previous mehods for manufacturing such components.

A still further object is to produce high-quality, thin film electrical components by continuous flow production line methods by eliminating the need for batch method manufacturing steps.

Another object is to produce high-quality electrical components having thin conductive films by a method which eliminates the large and expensive equipment heretofore required for manufacturing such components.

Figure 2:
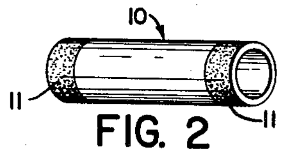
Figure 3:
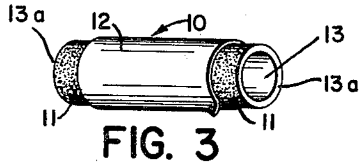
Figure 4:
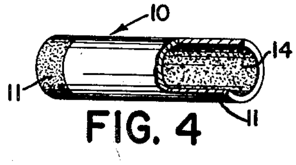
Figure 5:
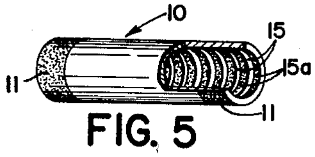
Figure 6:
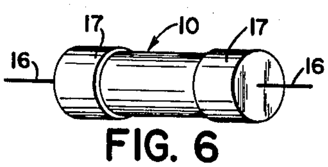
Figure 7:
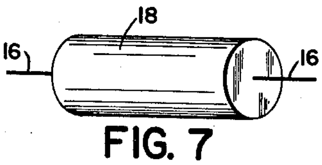
Figure 8:
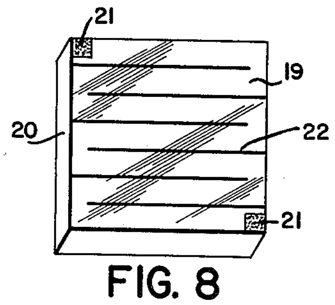
Figure 9:
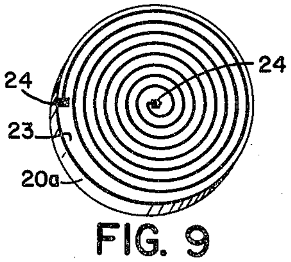
Figure 10:
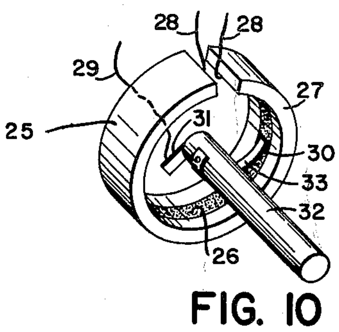
Figure 11:
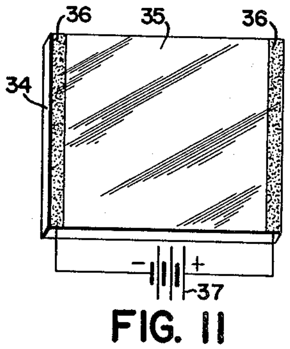

The invention together with the above and other objects, features and advantages will be best understood from a reading of the specification and claims taken in conjunction with the drawings in which:

FIGURE 1 shows a substrate, with a portion broken away, of a suitable material used as a base for a resistance unit manufactured in accordance with the invention, FIGURE 2 shows the substrate with metallic contacts affixed to its opposite ends, FIGURE 3 shows the substrate with a protective covering in place prior to its immersion in a plating solution, FIGURE 4 shows the substrate, with a portion broken away, after a thin film of resistance material has been deposited, FIGURE 5 illustrates the composite resistance unit showing a spiral resistance pattern formed by a suitable cutting operation whereby a spiral cut is made in the thin film resistance coating, FIGURE 6 shows the resistance unit with end caps affixed and leads connected thereto, FIGURE 7 shows the finished resistor as a completely encapsulated unit, FIGURES 8 and 9 illustrate two of the many various alternative shaped blanks that may be employed as substrates for resistance units, FIGURE 10 illustrates one form of potentiometer utilizing a thin resistance film, and FIGURE 11 shows one form of heating element employing a thin resistance film manufactured in accordance with the teachings of the invention.

Briefly, the invention contemplates the manufacture of electrical components by depositing a suitable thin electrically resistive coating on the surface of an insulating substrate in accordance with an auto-catalytic chemical reduction process and then heat treating the unit thus produced to modify the temperature coefficient of resistance and to stabilize its resistance value. The film may then be formed into a continuous resistance path pattern to produce a desired resistance value, or if preferred, a predetermined resistance path pattern may be formed during the process of deposition of film on the substrate. The component may then be encapsulated, if desired, to protect it against undesirable atmospheric influences.

Referring now to the drawings, there is shown in FIGURE 1 a substrate or blank, in the form of a hollow cylinder having suitable electrical insulating properties, to serve as a base for the deposition of a thin film resistance coating thereon. This blank which is often termed a base member or body can be made of a variety of insulating materials such as resins, ceramics and the like. Thus Teflon, polystyrene, steatite, quartz, glass or alumina, to name but a few, may be used advantageously. For illustrative purposes only, the blank is shown in the form of a short length of steatite tubing 10.

In order to provide conductors for the ends of the resistance film to be deposited on the cylinder blank, each end is provided with a contact 11 in the form of a conductive coating as shown in FIGURE 2. Any suitable conductive material may be applied by an appropriate technique. We have successfully used a silver frit preparation comprising small particles of metallic silver and glass with clay and flux intermixed. This preparation is applied to the ends by dipping or painting and then allowed to dry. The blank is then fired to bond the silver particles to the end surfaces of the blank. These contacts or conductors 11 may also be applied after the resistance film is deposited, if desired.

In accordance with the illustrative method herein described, ony the inside of the cylinder blank is coated with the resistance material. Accordingly, prior to application of the resistance film, a mask such as a strip of tape 12 is wound around the cylinder, as shown in FIGURE 3, and is removed after deposition of the film. This mask will prevent deposition of the resistance film on the outer surface beneath the mask so that only the exposed inner and end surfaces of the cylinder and the contacts 11 will then become coated with the resistance film as will be seen hereinafter. If desired, the outside surface could of course be coated instead of the inside, or both surfaces could be coated to provide parallel circuits between the end contacts, thus achieving very low resistance values.

The deposition of the thin resistance film is accomplished by means of an autocatalytic chemical reduction process, the basic mechanics of which are known in the chemical art and described in ASTM Special Technical Publication No. 265, entitled "Symposium on Electroless Nickel Plating," published in 1959 by the American Society for Testing materials. This is a plating process which is accomplished without the use of electricity and has therefore come to be known as an electroless plating process.

The initiation of this process requires the presence of a catalytic material, and in practicing our invention this initiating catalytic material is provided on the surface of the substrate to be plated, though other techniques may also be used, as will be seen below. Some of the catalytic materials which are known to initiate the process are: nickel, iron, cobalt, ruthenium, rhodium, palladium, osmium, iridium and platinum. Once the reaction is initiated, nickel is deposited on the substrate from the plating bath and this nickel acts to catalyze further reaction, thus accounting for the autocatalytic nature of the reaction.

One satisfactory method of providing an initiating catalyst on the surface of the substrate 10 involves immersing the substrate for several minutes into a hot palladium chloride solution containing from 0.01 to 1.0 gram per liter of palladium chloride. This step results in the deposition of minute amounts of metallic palladium on the internal surface 13, the end surfaces 13*a* and the contacts 11.

Instead of employing the solution of hot palladium chloride described above to provide the necessary catalytic action, a cold solution can be employed as an alternative. In order to be satisfactory, however, the cold palladium chloride solution must be preceded by a dip in a suitable reducing agent solution such as that comprising stannous chloride and hydrochloric acid. The purpose of the stannous chloride dip is to sensitize or condition the surface so that when the substrate is later immersed in the cold palladium chloride, the stannous chloride acts as a reducing agent to cause minute amounts of metallic palladium to be reduced from the palladium chloride and deposited on the surface of the substrate. The substrate should be thoroughly water-rinsed between the stannous chloride and palladium chloride steps. Other suitable reducing agents such as, for example, hydrazine could be substituted for the stannous chloride solution. After deposition of the initiating catalytic material, the substrate should be rinsed with water before the electroless plating bath step which follows.

The above techniques for providing a catalyst on the surface of the material to be plated are only illustrative of well-known techniques in the electroless plating art and are not the only methods that can be employed. Any other suitable technique for providing minute amounts of the initiating catalytic material either on or in the surface of the material to be plated could be used. For example, such catalytic material could also be sprayed or painted on the substrate surface, or be dispersed in the mass of substrate material during its manufacture or be impregnated into its surface.

When the substrate has been prepared in accordance with the above procedure, it is next immersed in an electroless plating or metallizing bath for the purpose of depositing the resistance film 14 thereon, see FIGURE 4. The metallizing bath is known generally in the chemical art and includes the following constituents: (*a*) a metal salt, such as, for example, nickel chloride, which is the source of the metal to be deposited, (*b*) an active chemical reducing agent, such as a hypophosphite ion, which may be obtained, for example, from sodium hydrophosphite, and (c) a buffer or complexing agent such as sodium acetate. The complexing agent serves two purposes; it maintains the metal salt in solution in the form of complexes as the pH value increases and it also serves as a buffer to keep the pH value of the bath room changing too rapidly during the plating operation. This latter condition would vary the rate of deposition of the nickel from the bath and would also produce other undesirable effects. We have succeeded in obtaining nickel resistance films of excellent quality by the use of an electroless plating bath comprising the following:

| | Grams/liter |
|---|---|
| Nickel chloride (metal salt) | 3–50 |
| Sodium hypophosphite (reducing agent) | 10–100 |
| Sodium acetate (complexing agent or buffer) | 10–200 |

These constituents are not the only chemical compounds, nor do these ranges specify the only ranges, that may be successfully employed to form a satisfactory electroless plating solution. For example, to mention some alternatives, nickel sulfate can be used instead of nickel chloride as the metal salt, any compound which will serve as a suitable reducing agent such as, for example, boron hydride or hydrazine may be employed, and the buffer may also consist of sodium succinate, gylcolate, citrate or tartrate. In fact the solution can be modified by substituting a cobalt salt instead of, or in addition to, a nickel salt to produce a film comprising essentially cobalt or nickel-cobalt respectively. Further details in this regard can be obtained from Research Paper RP1835, vol. 39, November 1947, Part 5, of the Journal of Research of the National Bureau of Standards, entitled "Deposition of Nickel and Cobalt by Chemical Reduction," by Abner Brenner and Grace Riddell.

Good deposition of the resistance film from the nickel bath described above is achieved with the bath pH value maintained in the range of 4 to 6.5 for acid solutions. The solution can be satisfactorily operated at acid pH values other than in this range but often with less satisfactory results. For example, the deposition rate appears to drop off markedly in the pH range of 3 to 4 and accordingly suitable monitoring apparatus should be provided to insure that the pH factor is maintained in the preferred range of 4 to 6.5. Satisfactory deposition can also be achieved by operating the bath as an alkaline solution rather than as an acid solution. This can be accomplished by eliminating the complexing agent and adding ammonium chloride to bring the pH factor in the alkaline range of 7 to 11. Best results with alkaline baths appear to be obtained by maintaining the pH in the range of 8 to 10 although satisfactory results can be obtained at other alkaline pH values.

A bath temperature in the general range of from about ordinary room temperature to 100° C., when the pH value is maintained within the 4–6.5 value referred to above, can be employed. However, operating very close to 100° C. at atmospheric pressure can cause uncontrolled deposition of the nickel coating from the electroless plating bath which is of course a completely unsatisfactory condition. The 100° C. temperature should therefore be avoided and the bath should be operated at a temperature at least several degrees below this figure.

The substrate 10 is immersed in the plating or metallizing solution for a period ranging from several seconds to the greater part of an hour, depending upon the thickness of the film or coating desired which is determined by the ultimate value of resistance desired. If extremely high and low ultimate resistance values are desired, immersion times less than several seconds or greater than one hour, respectively, might be required depending upon the specific value desired. It should also be observed that the deposition rate depends upon a number of factors, among which are, in both the acid and alkaline solutions, the temperature and pH values of the bath, and in the case of the alkaline solution the nickel and hypophosphite concentrations. Accordingly, in order to produce a given film thickness different immersion times will be required depending upon these factors.

The nature of the resistance film 14 which is deposited during immersion in the above plating bath appears to be an alloy or compound comprising principally metallic nickel intermixed with finely dispersed phosphorous, but precisely what physical form the phosphorous takes is not agreed upon by those knowledgeable in the chemical arts. If a cobalt salt were employed instead of nickel salt in the plating bath as mentioned above, the resulting film would comprise cobalt and phosphorous. Nickel and cobalt salts together would of course produce an alloy or compound comprising nickel, cobalt and phosphorous. Still other materials besides nickel and cobalt could of course be employed.

The thin conductive film 14 has, without further treatment, several undesirable electrical characteristics. Specifically, the electrical resistance value of the film measured between the end contacts 11 is extremely unstable and is subject to permanent change with exposure to elevated temperatures. Additionally, the temperature coefficient of resistance is also extremely unstable to the extent that changes in this characteristic may be caused by commonly encountered temperature changes within the room temperature range. Both of these undesirable characteristics can be eliminated by heat treating the resistance film in accordance with a predetermined heating or baking schedule.

Accordingly, the units are baked in air at a selected temperature, which may be between 250° and 650° Fahrenheit, for a sufficient period of time, usually several hours, which results in stabilization of both the resistance and temperature coefficient characteristics. We have found that, generally speaking, increased baking time at a give temperature reduces the resistance. The greatest resistance change occurs in the first several minutes, however extended baking time is required in order to achieve good resistance stability. We also found that, unlike prior art resistance films, the temperature at which the film is baked determines the change in the temperature coefficient of resistance and generally speaking, the higher the temperature the greater this change will be. A minimum baking time is required, which varies with the temperature selected. Before heat treatment, the coefficient is usually negative for the medium and high film resistance values and tends to become less negative and may even be positive for the very low values. By selecting the baking temperature, we have discovered that the temperature coefficient of resistance can be selectively changed from an initially negative value to a less negative value, to zero, or to a positive value, greater change being effected when baking at more elevated temperatures and less change when baking at lower temperatures.

The baking process will generally reduce the film resistance to a fraction of its pre-baking value, resistance values of from 5 to 40% of the initial resistance value usually resulting from the baking schedules we have thus far employed. While it is usual to heat treat by baking in a suitable oven, the desired heat treatment can also be accomplished by passing electrical current through the resistance film. Heat treatment also improves the adhesion properties between the film and substrate, as well as improves the film hardness. The latter quality is important when the film is employed in potentiometers since the wear resistance of the film depends upon its hardness.

Table I below shows the effect of heat treatment at approximately 600° Fahrenheit for several hours on the resistance value and the temperature coefficient of resistance value of several representative test samples. Similar good results can also be achieved with many different time-temperature combinations.

*Table I*

| Test Sample | Resistance @ 25° C. | | Temp. Coefficient of Res. | |
|---|---|---|---|---|
| | Before Baking, Ohms | After Baking, Ohms | Before Baking, percent/° C. | After Baking, percent/° C. |
| A | 151 | 33 | −0.0094 | +0.003 |
| B | 11,000 | 272 | −0.020 | −0.0003 |
| C | 17,000 | 449 | −0.0219 | −0.0035 |

After the heat treating or baking phase, the resistance of the film 14 is measured between the end contacts 11 and spiral pattern 15 may be cut in the film to form a helical resistance pattern 15*a* as seen in FIGURE 5, in accordance with well known techniques, to produce the precise ultimate resistance value desired. The post-baking resistance value of the uncut film will of course determine the range of ultimate desired resistance values that can be achieved by changing the pattern of the conductive film. A relatively wide range of ultimate resistance values can be produced from any given uncut resistance film by varying the lead of the spiral 15. For example, in the case of the test sample A in Table I above, a resistance value of from 33 ohms to approximately 15,000 ohms can easily be obtained. The practical upper limit of resistance from any given blank would depend not only upon the uncut post-baking resistance value, but also upon the desired power rating of the resistor and the width of the spiral cut.

After the precise value has been achieved by means of the spiral cut, terminal wires 16, see FIGURE 6, are connected to the contacts 11 by means of end caps 17 which make permanent electrical connection with these contacts. The entire unit can then be encapsulated to protect it from undesirable atmospheric influences by embedding it in a suitable insulating casing 18 as shown in FIGURE 7.

Although the description has been carried out with specific reference to resistance film deposition upon a hollow cylindrical substrate, it should be clearly understood that this specific description is merely illustrative and that many variations thereof will occur to those skilled in the art. For example, resistance units of varying shapes such as planar units, micro-modular units and potentiometer units can be made. Thus, FIGURE 8 illustrates a rectangular planar resistance unit made in accordance with the teachings of this invention, having a film 19 deposited on a substrate 20 and formed into a resistance pattern between end contacts 21 by a series of line 22 cut in the film. The method of forming such a resistance pattern is, as in the case of the spiral pattern above, well known in the art. FIGURE 9 shows a substrate 20*a* in the form of a disc having a helical film pattern 23 disposed on one of its planar surfaces between a pair of contacts 24.

The above method may, of course, be modified in vairous ways, depending upon the desired result. For example, instead of cutting a resistance pattern after the heat treatment phase, the desired pattern may be formed in other ways, such as for example by deposition of the film only on selected areas of the substrate. Using such an alternative, the desired resistance value would then be achieved by depositing the proper film thickness and then subjecting the resistance unit to an appropriate heat treating schedule designed to produce this value. By employing such alternatives, however, less success would probably be obtained in achieving the precise desired resistance value and temperature coefficient of resistance value for any given manufacturing lot.

FIGURE 10 illustrates a potentiometer unit comprising a substrate 25 having a resistance film 26 deposited on the inner surface thereof and heat treated in accordance with the invention. Alternatively, the film could also be deposited on the outer cylindrical surface of the substrate or on a planar edge such as the edge 27. A pair of terminal wires 28 are appropriately connected to the ends of the resistive film 26, the third wire 29 being connected to the potentiometer slider contact 30 through any suitable conductive arrangement such as the spring 31, shaft 32 and slider arm 33. If a potentiometer unit having a spiral or helix resistive pattern of the type shown in FIG. 5 is employed, a suitable slider 30 (FIG. 10) and drive mechanism such as those shown by Douglas in U.S. Patent 1,606,153 or Erb in U.S. Patent 2,371,159 may be used. With the drive mechanism shown by Douglas, for example, the slider 30 (FIG. 10) contacting the thin film follows the helix resistive pattern 15*a* (FIG. 5) moving substantially from one end of the thin film helix to the other. The process described herein is particularly advantageous for applying thin resistance films to miniature potentiometers in view of the well known difficulties of manufacturing such potentiometers by known methods. The advantages of this process over the conventional vapor deposition method as applied to potentiometers are clear from other parts of this specification and the difficulties encountered in forming miniature potentiometer resistance elements with very fine wire are eliminated by depositing the resistance film in accordance with the present method.

FIGURE 11 shows one form of a heating element made according to the invention which comprises a substrate 34 having a surface coated with a thin resistive film 35 between two elongated metallic end contacts 36, also on the surface. A suitable power source 37 is provided between the end contacts 36 to supply the necessary current for the desired heating requirements. Such an arrangement affords a convenient means for producing different amounts of heat dissipation for a given size unit merely by controlling the resistance film thickness, since the resistance value depends upon the thickness. If desired, a suitable insulating coating, not shown, could be applied over all exposed film and contact areas for isolation and shock protection purposes.

From the foregoing it will be clear that we have developed both a resistance unit of higher quality and far superior method for manufacturing such units than was heretofore known. Accordingly, unlike prior art resistance units, the temperature coefficient of resistance of the films deposited as described herein can be controlled by appropriate heat treatment to any desired value, within the inherent limitations of the film material employed. An additional advantage of these units is that the temperature coefficient is controllable to closer tolerances and once fixed at the desired value, it varies more linearly with changes in temperatue than prior art units, and accordingly is more desirable for most applications. There are also many important advantages resulting from the new method for making these units, the outstanding among which is the equipment cost for the process, which is a small fraction of that previously required for manufacturing similar quality resistors. As a result, the manufacturing cost of each unit is considerably less than with known methods. Additionally, manufacturing time is only a small fraction of that prviously required and a lower reject percentage is realized. Further, the process is simpler, more reliable and easier to control and can be readily adapted to continuous flow production line techniques, since many blanks can be subjected simultaneously to a given process phase such as the plating bath, heat treatment, and so forth.

Since many other changes than those already referred to could be made in the above constructions and many apparently widely different embodiments of this invention could be made without departing from the scope thereof, it is intended that all matter contained in the above description or shown in the accompanying drawings shall be interpreted as illustrative and not in a limiting sense.

We claim:

1. A high quality resistance unit comprising a substrate having good electrical insulating properties, and a film of an electrically resistive material deposited on a surface of said substrate, said electrically resistive material being constituted essentially of at least one element from the group consisting of nickel and cobalt intermixed with phosphorous uniformly dispersed throughout said film, said unit being further characterized by having a temperature coefficient of resistance of an initial value which is changed to a selected final value by means of a predetermined heat-treating schedule.

2. A high quality thin film resistance unit comprising a substrate of generally cylindrical shape and having good electrical insulating properties, a thin film of an electrically resistive material deposited in the form of a helical pattern on at least one cylindrical surface of said substrate, and a terminal adapted for connection to each end of said pattern, said material being constituted essentially of metallic nickel intermixed with phosphorous uniformly dispersed throughout said film of which three to fifteen percent by weight is phosphorous and substantially the entire balance is nickel.

3. A high quality resistance unit including a substrate having a thin electrically resistive film of which three to fifteen percent by weight is phosphorous and substantially the entire balance is nickel deposited thereon and having a selectively controllable temperature coefficient of resistance, said temperature coefficient being selectively fixed in accordance with a heating cycle comprising the steps of heating said unit to a predetermined temperature to change the temperature coefficient of resistance of said film from an initial value to a selected final value, maintaining said temperature at said predetermined value for a predetermined period of time to stabilize the resistance value of said film, and forming said film into an elongated resistance path to produce a desired value of resistance between the ends of said path.

4. A resistance unit comprising a substantially electrically non-conductive substrate,
a film of an electrically resistive material of which three to fifteen percent by weight is phosphorous and substantially the entire balance is nickel deposited on a surface of said substrate,
said film being characterized by having a temperature coefficient of resistance of an initial given value which is substantially changed to a selected final value by means of a predetermined heat-treating schedule,
and electrically conductive contacts on spaced areas of said substrate disposed over at least part of said film.

5. A high quality thin film resistance unit comprising:
a substrate of a generally tubular shape and having good electrical insulating properties,
a thin film of an electrically resistive material deposited in the form of a helical pattern on at least one cylindrical surface of said substrate,
electrically conductive contacts on each end of the substrate disposed over at least a portion of said thin film for connection to each end of said pattern,
said film material being constituted essentially of at least one element of the group consisting of nickel and cobalt intermixed with phosphorous uniformly dispersed throughout said film,
said film being further characterized by having a temperature coefficient of resistance of an initial value which is changed to a selected final value by means of a predetermined heat-treating schedule,
and electrically conductive end caps affixed to said resistance unit making electrical contact with said contacts,
said contacts acting as electrical connectors between the resistance film and the end caps.

6. A variable resistor comprising an electrically non-conductive tubular base member,
a helix of a thin film of an electrically resistive material on the inside wall of said tubular base member,
said film material being constituted essentially of at least one element of the group consisting of nickel and cobalt intermixed with phosphorous uniformly dispersed throughout said film,
said film being further characterized by having a temperature coefficient of resistance of an initial value which is changed to a selected final value by means of a predetermined heat-treating schedule,
an electrically conductive terminal on at least one end of said tubular base member overlying at least a portion of said thin film,
a slider contacting said thin film adapted to move along said helix,
means for adjusting said resistor by moving the slider along said helix substantially from one end of the film to the other thereby to obtain substantially infinite resolution of resistance change between said slider and said terminal as the slider is moved,
and means for connecting said terminal and said slider into an electrical circuit.

7. A variable resistor comprising an electrically non-conductive tubular base member having an electrically conductive terminal on at least one end thereof,
a helix of a thin film of an electrically resistive material on the inside wall of said tubular base member and overlying said terminal,
said film material being constituted essentially of at least one element of the group consisting of nickel and cobalt intermixed with phosphorous uniformly dispersed throughout said film,
said film being further characterized by having a temperature coefficient of resistance of an initial value which is changed to a selected final value by means of a predetermined heat-treating schedule,
a slider contacting said thin film adapted to move along said helix,
means for adjusting said resistor by moving the slider along said helix substantially from one end of the film to the other thereby to obtain substantially infinite resolution of resistance change between said slider and said terminal as the slider is moved,
and means for connecting said terminal and said slider into an electrical circuit.

References Cited in the file of this patent

UNITED STATES PATENTS

| | | |
|---|---|---|
| 2,532,283 | Brenner et al. | Dec. 5, 1950 |
| 2,820,727 | Grattidge | Jan. 21, 1958 |
| 2,926,325 | Moore et al. | Feb. 23, 1960 |
| 2,934,736 | Davis | Apr. 26, 1960 |
| 2,953,484 | Tellkamp | Sept. 20, 1960 |
| 2,987,423 | Sternberg | June 6, 1961 |
| 2,994,847 | Vodar | Aug. 1, 1961 |
| 3,013,328 | Beggs | Dec. 19, 1961 |